(12) United States Patent
Hori

(10) Patent No.: US 6,215,604 B1
(45) Date of Patent: Apr. 10, 2001

(54) OPTICAL LENS CAPABLE OF BEING EASILY FITTED IN CAVITY OF LENS HOLDER WITH HIGH POSITIONING ACCURACY

(75) Inventor: Ken'ichi Hori, Kawasaki (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/491,820

(22) Filed: Jan. 26, 2000

(30) Foreign Application Priority Data

Jan. 28, 1999 (JP) .................................................. 11-019812

(51) Int. Cl.[7] .................................................. G02B 7/02
(52) U.S. Cl. .................................................. 359/819
(58) Field of Search ........................... 359/808, 811, 359/819, 820

(56) References Cited

U.S. PATENT DOCUMENTS

| | | | |
|---|---|---|---|
| 4,662,717 | 5/1987 | Yamada et al. ...................... | 350/245 |
| 5,024,509 | 6/1991 | Kurihara et al. ...................... | 350/254 |
| 5,396,487 | 3/1995 | Abe et al. ............................ | 359/819 |
| 5,608,579 | 3/1997 | Nomura ............................... | 359/820 |

FOREIGN PATENT DOCUMENTS 196 23 418
A1    12/1997 (DE) .

*Primary Examiner*—Ricky Mack
(74) *Attorney, Agent, or Firm*—Frishauf, Holtz, Goodman, Langer & Chick, P.C.

(57) ABSTRACT

In an optical lens, a projection is formed on a peripheral surface of a lens body and protrudes to a radial direction of the lens body. The lens body has an outside diameter smaller than a predetermined inside diameter of a cavity of a lens holder. The projection interferes with a fitting of the lens body in the cavity without resistance. When the lens body is pressed in the cavity, the projection is deformed by the lens holder and follow the lens body fitting in the cavity.

7 Claims, 3 Drawing Sheets

OPTICAL LENS CAPABLE OF BEING EASILY FITTED IN CAVITY OF LENS HOLDER WITH HIGH POSITIONING ACCURACY

BACKGROUND OF THE INVENTION

This invention relates to an optical lens which is held by a lens holder, particularly, relates to an optical lens which is capable of being easily fitted in a cavity of a lens holder with high positioning accuracy.

As well known, an electronic data processing equipment such as a personal computer is connected to various peripheral devices which include a memory device. As the memory device, an optical disk memory device can be used.

The optical disc memory device is, for example, a CD-R drive which can write/read data to/From a CD-R (compact disc recordable) as a recording medium by using a laser beam. The CD-R is a write-once optical disc that allows additional writing many times but does not allow erasing data recorded thereon. The CD-R can be used for a CD-ROM or a CD-DA (audio CD) because the data recorded thereon can be read by a normal CD-ROM drive.

The optical disc memory device has an optical pickup to apply the laser beam on a surface of the recording medium and to detect the reflection from the surface. The optical pickup includes a laser beam source for emitting the laser beam, an object or optical lens for gathering the laser beam from the laser beam source on the surface of the recording medium, and a lens holder for holding the object lens.

The lens holder has a through-hole for passing the laser beam through therein. A part of the through-hole serves as a cavity for receiving the object lens. Generally, the cavity is larger than the other part of the through-hole in inner diameter.

In a conventional technique, the object lens is fitted in the cavity of the lens holder by a running (or free) fit method or an interference fit method.

In the running fit method, there is a problem that it is difficult to put the object lens in a desired position of the cavity. In other wards, the running fit method can not position the object lens to the lens holder with high positioning accuracy. This is because there is a gap between a peripheral or outer side surface of the object lens and an inner side surface of the cavity. When the object lens is not in the desired position, it is impossible to obtain desired optical characteristics for the optical pickup.

On the other hand, the interference fit method does not have such a problem as the running fit method. However, the interference fit method has another problem that it is necessary to press the object lens with large pressing force in the cavity. The large pressing force deforms the object lens and deteriorates optical characteristics for the optical pickup.

SUMMARY OF THE INVENTION

It is therefore an object of this invention to provide an optical lens which is capable of being easily fitted in a cavity of a lens holder with high positioning accuracy.

It is another object of this invention to provide a lens holder which is suitable for the above mentioned optical lens.

Other object of this invention will become clear as the description proceeds.

On describing the gist of this invention, it is possible to understand that an optical lens is fitted in a cavity of a lens holder and fixed thereto. The cavity has a predetermined inside diameter.

According to the gist of this invention, the optical lens comprises a lens body having a peripheral surface and an outside diameter smaller than the predetermined inside diameter. A projection is formed on the peripheral surface and protrudes to a radial direction for interfering with a fitting of the lens body in the cavity without resistance.

According to another gist of this invention, a lens holder is for holding the above mentioned optical lens. The lens holder comprises a first section having the cavity with a trench which is for partially receiving the projection when the optical lens is fitted in the cavity. A second section is continuous with the first section and has a hole which is continuous with the cavity and which has an inside diameter smaller than the outside diameter of the lens body.

According to still another gist of this invention, an optical lens has a lens body which has a peripheral surface and an outer diameter. A projection is formed on the peripheral surface and protrudes in a radial direction of the optical lens. A lens holder has a cavity which has an inner diameter larger than the outer diameter to receive the lens body. A method of fixing of the optical lens to the lens holder comprises the steps of placing the optical lens in front of the cavity, and pressing the optical lens in the cavity while deforming the projection thereby.

DESCRIPTION OF THE PREFERRED EMBODIMENT

Figure 1A:
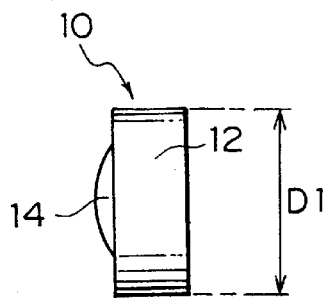
FIGS. 1A and 1B are side view and rear view of a conventional optical lens, respectively.
Figure 1B:
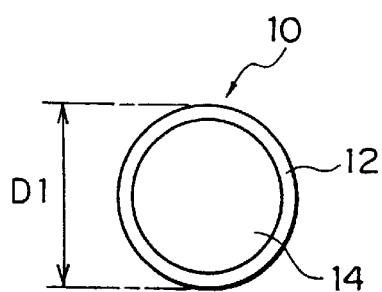

Referring to FIGS. 1A and 1B, description will be at first directed to a conventional optical lens for a better understanding of this invention.

FIGS. 1A and 1B are side view and rear view of the optical lens 10, respectively. As shown in FIGS. 1A and 1B, the optical lens 10 has a solid cylindrical part 12 with an outside diameter D1 and a spherical part 14 which is integrally formed on the solid cylindrical part 12. The optical lens 10 is held by a conventional lens holder as shown in FIGS. 2A and 2B.

Figure 2A:
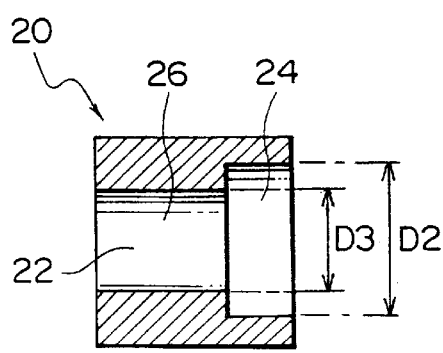
FIGS. 2A and 2B are sectional view and front view of a conventional lens holder, respectively.
Figure 2B:
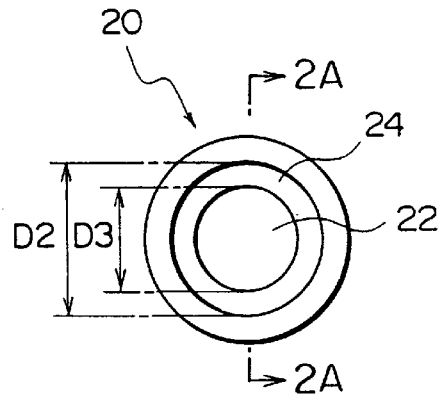

FIGS. 2A and 2B are sectional view and front view of the lens holder 20, respectively. As shown in FIGS. 2A and 2B, the lens holder 20 has a hollow cylindrical shape with a through-hole 22. A front part of the through-hole 22 serves as a receiving cavity 24 for receiving the optical lens 10. The receiving cavity 24 has an inner diameter D2 which is larger than that D3 of the other part (or a rear part) 26 of the through-hole 22.

The optical lens 10 is fitted in the receiving cavity 24 of the lens holder 20 with a running or free fit method or an interference fit method.

For the running fit method, the receiving cavity 24 is formed so that the inner diameter D2 is slightly larger than the outside diameter D1 of the optical lens 10. Consequently, the optical lens 10 can be fitted in the receiving cavity 24 without frictional resistance from the lens holder 20. The optical lens 10 fitted in the cavity 24 finally comes in contact with a step between the receiving cavity 24 and the other part 26 because the inner diameter D3 is smaller than the outside diameter D1. Then, the optical lens 10 is fixed to the lens holder 20 by, for example, an adhesive.

Figure 3A:
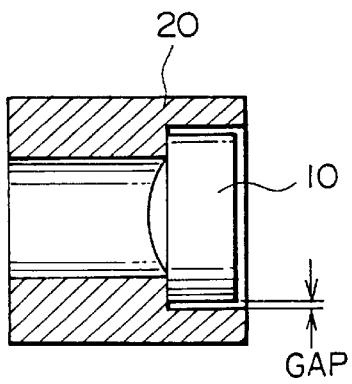
FIGS. 3A and 3B are sectional view and front view of the lens holder of FIGS. 2A and 2B with the optical lens of FIGS. 1A and 1B.
Figure 3B:
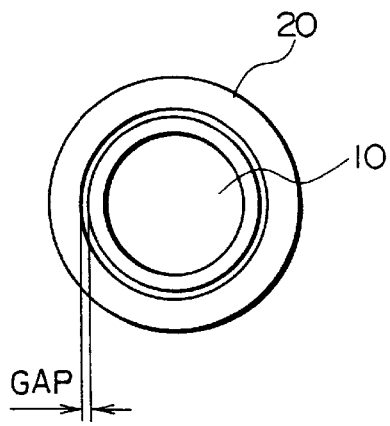

Thus, the optical lens 10 can be easily fitted in the cavity 24 according to the running fit method. However, it is difficult to put the optical lens 10 in a desired position of the cavity 24 according to the running fit method because there is a gap between the optical lens 10 and the lens holder 20 as illustrated in FIGS. 3A and 3B. Namely, the running fit method has low positioning accuracy of the optical lens into the cavity of the lens holder 20. Specifically, it is difficult to make an optical axis of the optical lens 10 coincide with a central axis of the lens holder 20 (or the through-hole 22). When the optical axis of the optical lens 10 does not coincide with the central axis of the lens holder 20, a laser beam travelling on the central axis of the lens holder 20 can not travel on the optical axis of the optical lens 10. As a result, the optical lens 10 held by the lens holder 20 can not provide desired optical characteristics.

On the other hand, for the interference fit method, the receiving cavity 24 is formed so that the inner diameter D2 is slightly smaller than the outside diameter D1. In this case, the optical lens can not be fitted without frictional resistance from an inner side surface of the lens holder. Consequently, fitting the optical lens 10 in the receiving cavity 24, it must be pressed with large pressing force. The large pressing force deforms the optical lens. The deformed optical lens 10 can not provide desired optical characteristics.

At any rate, the conventional optical lens 10 can not provide desired optical characteristics, when it is held by the lens holder 20.

Referring to FIGS. 4A–4C and 5A–5B, the description will proceed to an optical lens according to a preferred embodiment of this invention.

Figure 4A:
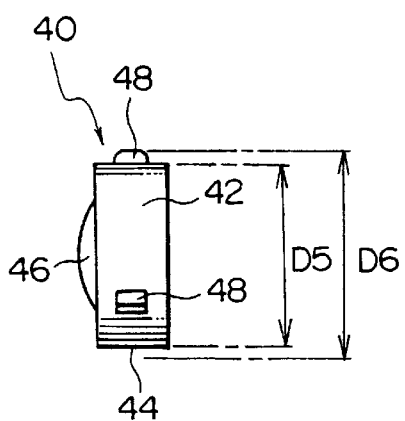
FIGS. 4A and 4B are side view and rear view of an optical lens according to a preferred embodiment of this invention, respectively.
Figure 4B:
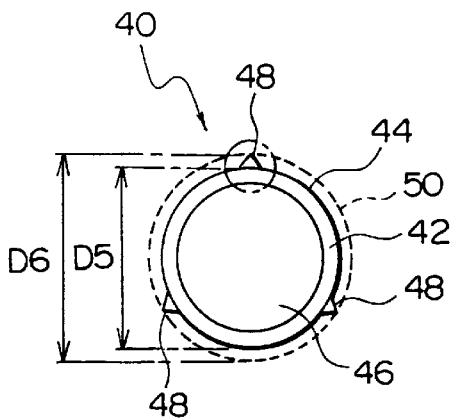
Figure 4C:
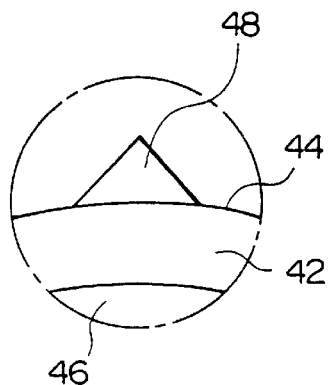
FIG. 4C is a partial enlarged view in a dashed-line circle of FIG. 4B.

FIGS. 4A and 4B are side view and rear view of the optical lens 40, respectively. FIG. 4C is a partial enlarged view of a region enclosed in a dashed line circle of FIG. 4B.

As shown in FIGS. 4A through 4C, the optical lens 40 comprises a solid cylindrical part 42 which has an outside diameter D5 and a peripheral or outer side surface 44. A solid spherical part 46 is integrally formed at a rear end of the solid cylindrical part 42 to form a lens body together with the solid cylindrical part 42. Three projections 48 are integrally formed on the peripheral surface 44 at regular intervals. The projections 48 project in radial direction so as to be inscribed to a supposed circle 50 having a diameter D6. Each of the projections 48 has a triangular shape in section but it may have semicircular shape in section.

Figure 5A:
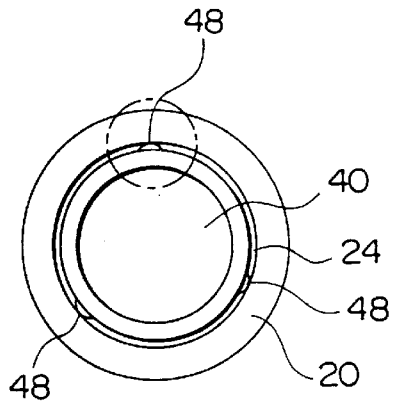
FIG. 5A is a front view of the lens holder of FIGS. 2A–2B with the optical lens of FIGS. 4A–4C.
Figure 5B:
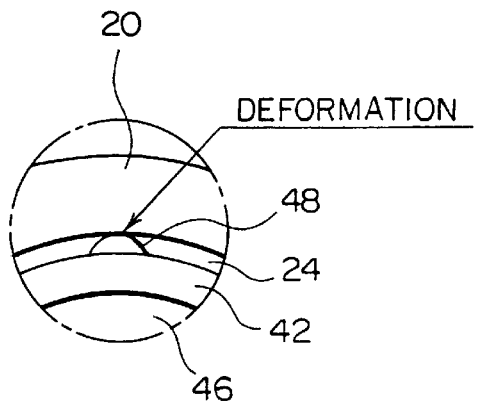
FIG. 5B is a partial enlarged view of a region enclosed in a dashed-line circle of FIG. 5A.

As shown in FIG. 5A, the optical lens 40 is fitted in the cavity 24 of the lens holder 20 (see FIGS. 2A and 2B). Herein, the outside diameter D5 is made so as to be slightly smaller than the inner diameter D2 of the cavity 24 of the lens holder 20. Furthermore, the projections 48 project so that the inner diameter D6 of the supposed circle 50 is slightly larger than the inner diameter D2 of the cavity 24. In addition, the lens holder 20 is harder than the optical lens 40. Compared with all area of the peripheral surface 44, areas occupied by the projections 48 on the peripheral surface 44 is very small. Accordingly, the projections 48 is easily deformed by the lens holder 20 when the optical lens 40 is pressed into the cavity 24 as shown in FIG. 5B. A pressing force used for fitting the optical lens 40 in the cavity 24 is considerably smaller than that in an interference fit method. Therefore, the optical lens 40 is easily fitted in the cavity 24 when the optical lens 40 is pressed into the cavity 24. Because the pressing force is small, the lens body is not deformed by the lens holder 20 in this event. Moreover, the projections 48 leads the lens body to a desired position in the cavity and keeps it in the desired position in this event. Therefore, it is easy to make an optical axis of the optical lens coincide with the central axis of the lens holder 20 with high positioning accuracy.

Figure 6A:
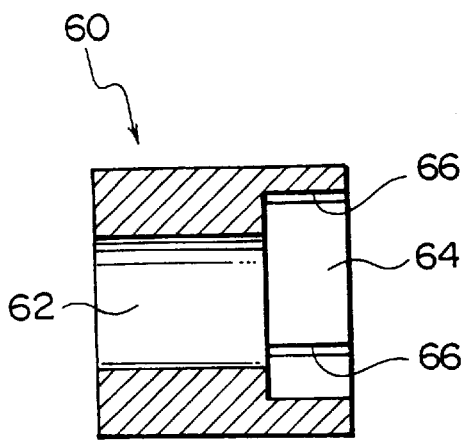
FIGS. 6A and 6B are sectional view and front view of a lens holder suitable for the optical lens of FIGS. 4A–4C, respectively.
Figure 6B:
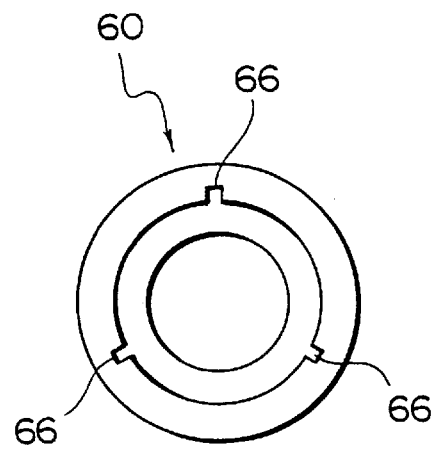

Referring to FIGS. 6A and 6B, the description will be made about a lens holder which is suitable for the optical lens 40.

In FIGS. 6A and 6B, the lens holder 60 has a hollow cylindrical shape with a through-hole 62 which includes a receiving cavity 64 like the cavity 24 of the conventional lens holder 20. The lens holder 60 further has three trenches 66 formed in an inner wall which provide the cavity 64. The trenches 66 extend along to a central axis of the lens holder 60 and are positioned at regular intervals in circumference direction and to correspond to the projections 48 of the optical lens 40.

Figure 7A:
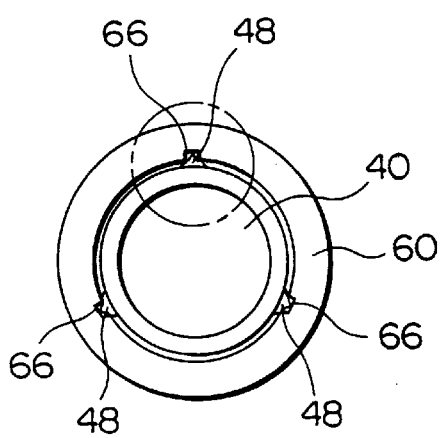
FIG. 7A is a front view of the lens holder of FIGS. 6A–6B with the optical lens of FIGS. 4A–4C.
Figure 7B:
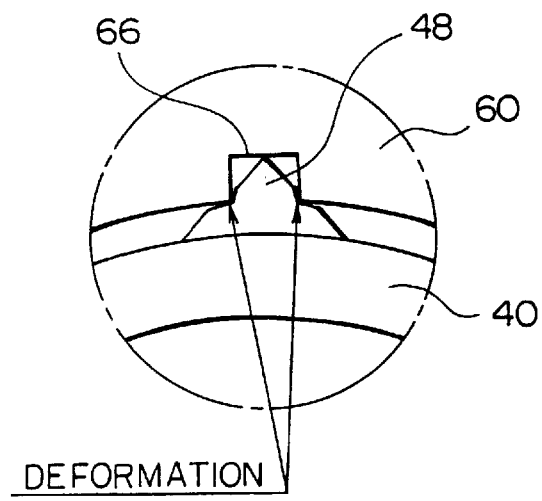
FIG. 7B is a partial enlarged view of a region enclosed in a dashed-line circle of FIG. 7A.

The optical lens 40 is fitted in the cavity 64 in a state that the projections 48 are matched with the trenches 66 as shown in FIG. 7A. The projections 48 partially enter the trenches 66 and are deformed as illustrated in FIG. 7B. The projections 48 and the trenches 66 not only lead the lens body to a desired position in the cavity 64 and keeps it in the desired position but also prevent the lens body rotating around its optical axis. The combinations of the projections 48 and the trenches 66 are advantageous to an optical lens that its rotation changes its optical characteristics.

While this invention has thus for been described in conjunction with the preferred embodiment thereof, it will readily be possible for those skilled in the art to put this invention into practice in various other manners. For example, the optical lens may have at least one projection. The lens holder may have at least one trench according to the number of the projection(s) of the optical lens.

The optical lens may have another shape. For example, the optical lens has two spherical part that is opposite to each other. In this case, if the lens body has a small or no peripheral or outer side surface, the projection(s) may be formed on an edge of the lens body.

What is claimed is:

1. An optical lens which is fitted in a cavity of a lens holder and fixed thereto, said cavity having a predetermined inside diameter, said optical lens comprising:
   a lens body having an peripheral surface and an outside diameter smaller than the predetermined inside diameter, and
   a projection formed on said peripheral surface and protruding to a radial direction for interfering with a fitting of said lens body in said cavity without resistance.

2. An optical lens as claimed in claim 1, wherein said projection is deformed by said lens holder when said lens body is pressed in said cavity.

3. An optical lens as claimed in claim 1, wherein said optical lens further comprises at least one additional projection formed on said peripheral surface.

4. An optical lens as claimed in claim 3, wherein the projections are positioned on said peripheral surface at regular intervals.

5. An optical lens as claimed in claim 4, wherein the number of said projections are three.

6. A lens holder for holding the optical lens claimed in claim 1, said lens holder comprising:

a first section having the cavity with a trench which is for partially receiving the projection when the optical lens is fitted in the cavity, and a second section being continuous with said first section and having a hole which has an inside diameter smaller than the outside diameter of said lens body.

7. A method of fixing of an optical lens to a lens holder, said optical lens having a lens body which has a peripheral surface and an outer diameter, and a projection which is formed on the peripheral surface and which protrudes in a radial direction of said optical lens, said lens holder having a cavity which has an inner diameter larger than the outer diameter to receive the lens body, comprising the steps of:

placing said optical lens in front of said cavity, and pressing said optical lens in said cavity while deforming said projection thereby.

* * * * *